(12) United States Patent
McCooey

(10) Patent No.: US 6,280,816 B1
(45) Date of Patent: Aug. 28, 2001

(54) METHOD FOR MANUFACTURING AN AUTOMOTIVE INTERIOR TRIM COMPONENT AND THE RESULTANT CONSTRUCTION THEREOF

(75) Inventor: David R. McCooey, Dover, NH (US)

(73) Assignee: Textron Automotive Company Inc., Troy, MI (US)

( * ) Notice: Subject to any disclaimer, the term of this patent is extended or adjusted under 35 U.S.C. 154(b) by 0 days.

(21) Appl. No.: 09/502,054

(22) Filed: Feb. 10, 2000

Related U.S. Application Data

(62) Division of application No. 09/156,226, filed on Sep. 18, 1998, now Pat. No. 6,076,246.

(51) Int. Cl.⁷ ...................................................... B32B 3/10
(52) U.S. Cl. .............................. 428/71; 428/133; 428/138
(58) Field of Search ................................ 428/71, 133, 138

(56) References Cited

U.S. PATENT DOCUMENTS 3,519,523 * 7/1970 Rodman et al. ........................ 428/71
4,784,366   11/1988 Muller .
4,839,118   6/1989 Labrie .
4,892,770   1/1990 Labrie .
4,973,235   11/1990 Shoji .
4,997,356   3/1991 Katagiri .
5,011,394   4/1991 Katagiri et al. .
5,018,958   5/1991 Mizuno et al. .
5,040,335   8/1991 Grimes .

* cited by examiner

Primary Examiner—Alexander S. Thomas
(74) Attorney, Agent, or Firm—Hayes, Soloway, Hennessey, Grossman & Hage, PC

(57) ABSTRACT

An automotive interior trim panel has an outer flexible skin that overlies a rigid backing panel formed with a foam entry hole through which foam precursors are poured into a space between the skin and panel and they react and expand to generate a foam layer within the space. Tab projections are carried by the panel and extend into the foam space to at least partially cover the opening and provide rigid backing support for foam expanding in the region of the entry hole to control the density of the foam in this entry hole region such that it conforms more closely with the density of the immediate surrounding foam.

17 Claims, 2 Drawing Sheets

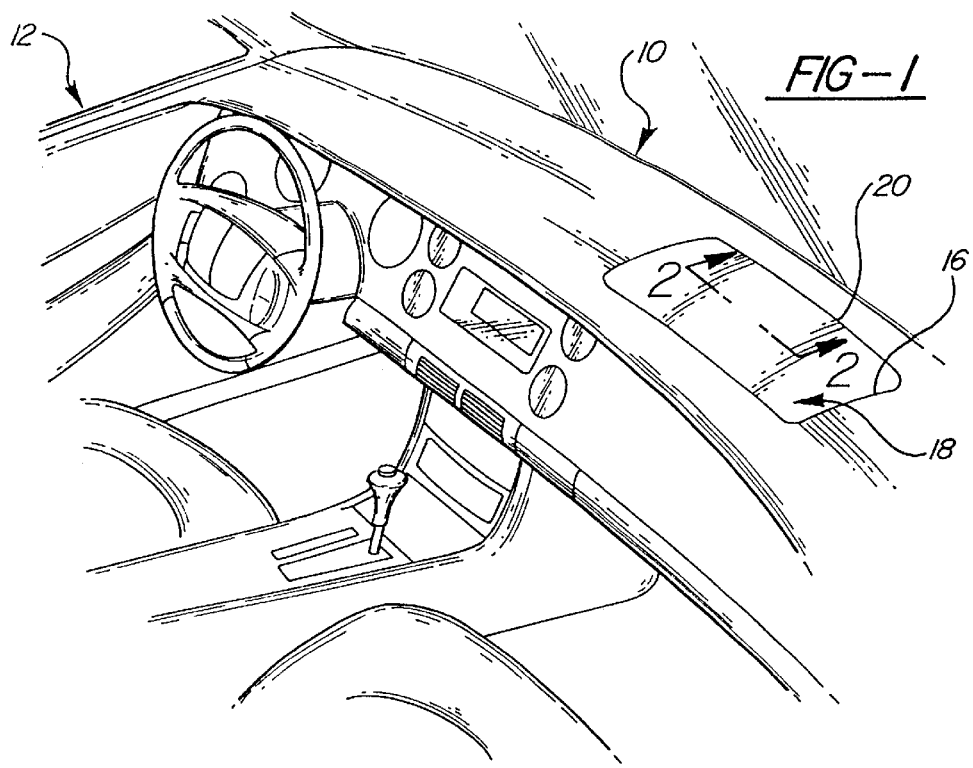
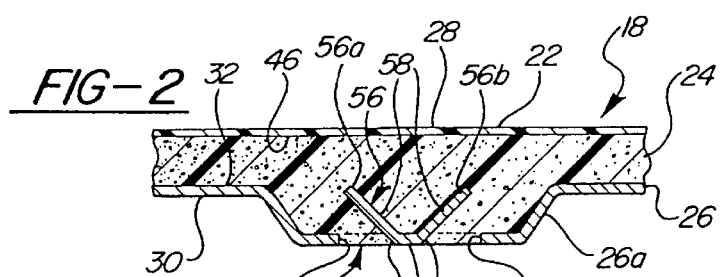
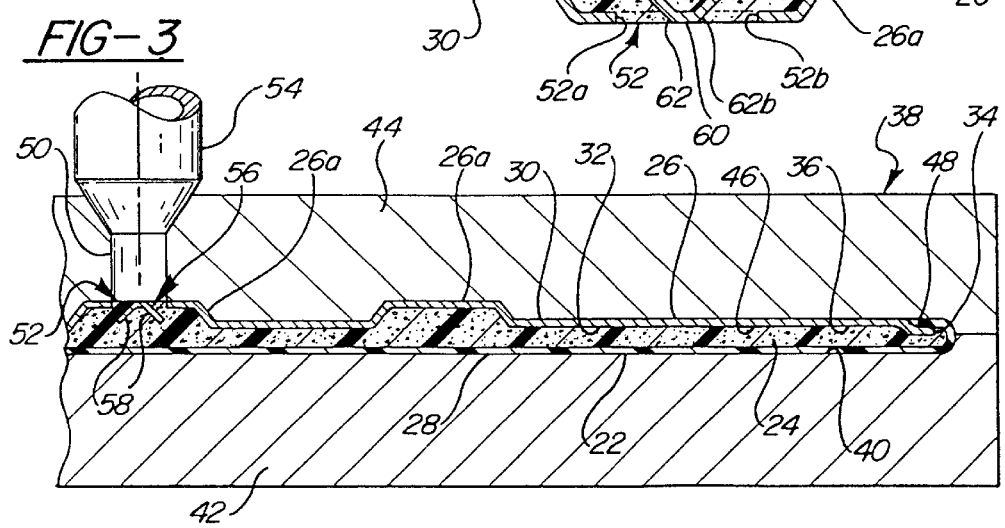

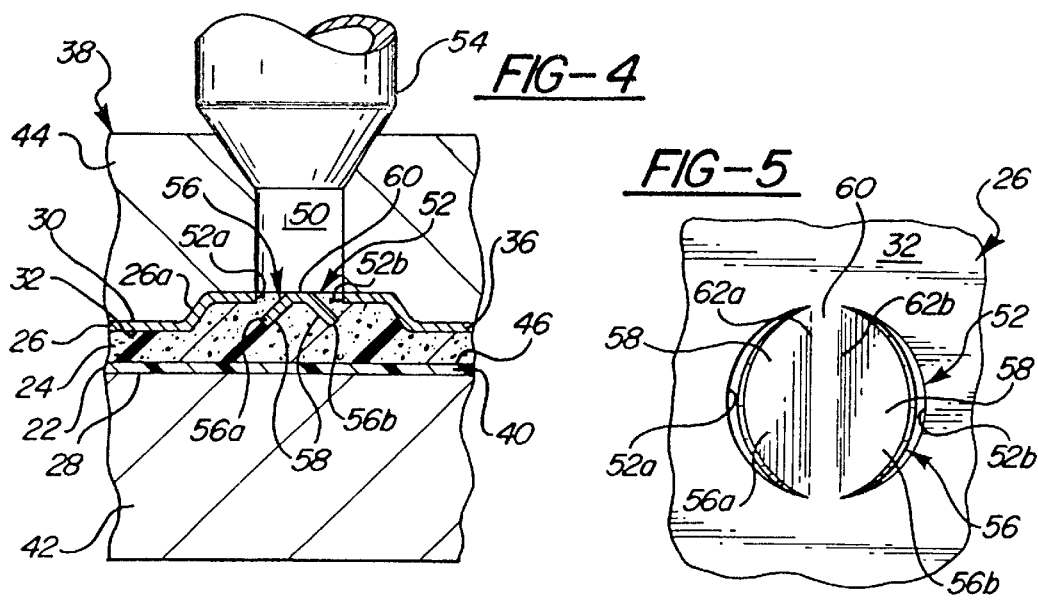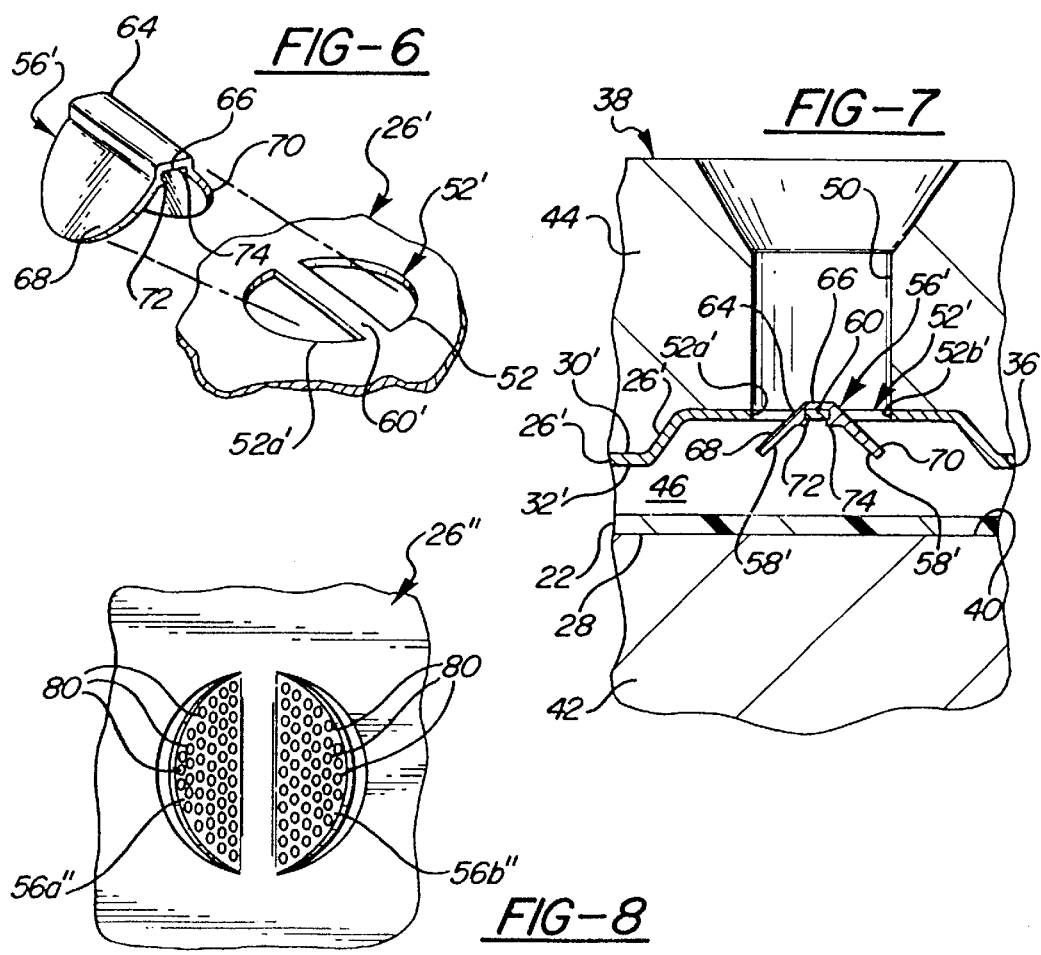

METHOD FOR MANUFACTURING AN AUTOMOTIVE INTERIOR TRIM COMPONENT AND THE RESULTANT CONSTRUCTION THEREOF

This is a division, of application Ser. No. 09/156,226, filed on Sep. 18, 1998 U.S. Pat. No. 6,076,246.

This invention relates generally to automotive interior trim components of the type having an outer pliable skin, a rigid backing panel, and a foam core in a space therebetween generated by injecting foam precursors into the space through a foam entry hole in the backing panel whereupon it commences to expand and fill the space with foam.

BACKGROUND OF THE INVENTION

In the manufacture of many interior automotive trim products, such as a door cover for a passenger supplemental inflatable restraint (PSIR) airbag system, glove and console compartment doors, door panels and instrument panels, and the like, a flexible skin or shell is placed in the cavity of the foam injection mold and a rigid insert backing panel is supported within the mold cavity above the skin to enclose and define a space for foam between the skin and backing panel. The backing panel is formed with a foam entry hole aligned with a pour hole of the upper mold part to provide an opening for the injection of foam precursors into the space whereupon they react and expand to fill the space and generate a foam core therein. In most applications, the spacing between the skin layer and the opposing interior surface of the backing panel is generally uniform resulting in a foam core that is of generally uniform density. However, in the region of the foam entry hole, there is no support to back up the foam during its expansion and as a consequence the foam in this region develops to a lower density than the immediate surrounding foam. This variation in density is particularly problematic in applications such as airbag doors which have a very thin cross section (on the order of 8 mm or less in thickness). In such instances, the relatively less dense foam in the region of the foam entry hole shows through on the outer class A surface of the skin as a depression or a soft spot that is more easily depressed than the surrounding areas of the airbag door.

It is current practice to form such foam entry holes by stamping out or molding a pair of adjacent semi-circular openings in the panel to provide a thin web or bridge between the openings that serves in some applications as a locking connection for the foam injection tool. Such construction is shown, for example, in U.S. Pat. No. 4,784,366, commonly owned by the assignee of the present invention. The foam in these open pour hole regions is less dense than that of the surrounding foam producing the sunken or soft spots mentioned above in the finished product.

SUMMARY OF THE INVENTION AND ADVANTAGES

According to the invention, an improved manufacturing process is provided for making an automotive interior trim component having an outer pliable skin bonded to a foam layer and a rigid backing panel, in which the skin and panel are supported in a cavity of a foam mold tool to provide a foam space between the skin and panel and foam precursors are poured into the foam space through a foam entry hole of the panel whereupon the precursors expand to fill the space and cure to generate the foam layer therein. The improvement comprises providing supplemental foam backing structure supported by the panel and extending across the foam entry hole to provide a supportive backing surface to the foam precursors in that region to control the density of the resultant foam in the foam entry hole region.

According to a particularly preferred embodiment of the invention, the foam entry hole is produced by punching tab portions in the backing panel as described above and then deforming the tab portions out of the general plane of the backing panel so they extend into the foam space to provide backing structure for the foam as it expands and cures in the foam space. Such provides a very simple, economical way to eliminate the sunken or soft spot regions that result from an open foam entry hole and without making significant modifications to the standard molding practice. A similar tab arrangement can be employed with a plastics backing panel, in which case the panel and tabs may be injection molded as a single piece.

According to another embodiment, the panel is molded from a rigid plastics material and at least a portion of the foam entry hole is formed by providing a pair of generally arcuate slots in the panel. Each slot defines an opening and also defines a unitary tab that integrally extends across and generally closes one of the openings in a closed position. A living hinge is formed across each tab. At least a portion of each tab is outwardly pivotable about its respective living hinge to an open position under the force of foam precursor injection. The hinges are sufficiently resilient to return the pivotable portions of the tabs to a position at least approximating the closed position.

According to another embodiment, a separate deflector piece is formed having leg portions of the same general configuration as that of the tabs attached to the web between the semicircular openings in the panel of a conventional foam entry hole such that the legs extend into the same general manner as the integrated tab portions to control the density of the foam that develops in the foam entry hole region.

According to still another aspect of the invention, an automotive interior trim panel assembly is provided having a rigid backing panel and an outer pliable skin overlying the panel and defining a foam space therebetween that is occupied by a foam core produced by injecting foam precursors into the foam space where they expand and fill the foam space to generate the foam core. Supplemental foam backing structure is supported by the backing panel within the foam space at least partially across the foam entry hole to provide a rigid support backing for the foam as it expands in the region of the pour hole in order to control its density.

According to another embodiment, the entry hole comprises at least one opening in the panel. The supplemental foam backing structure comprises a plastics material and includes at least one tab member extending from an edge of the opening across the opening. The tab generally closes the opening in a closed position. The tab includes a living hinge that extends across a width of the tab. At least a portion of the tab is outwardly pivotable about the living hinge to an open position under the force of foam precursor injection. The hinge is sufficiently resilient to return the pivotable portion of the tab to a position at least approximating the closed position.

According to another aspect of the invention, the entry hole comprises an adjacent pair of the openings separated by a partitioning web of the panel. The supplemental foam backing structure comprises a pair of the tab members that extend from the partitioning web across the respective openings and close the respective openings in respective closed positions. Each tab includes a living hinge that extends across a width of each the tab. At least a portion of each tab is outwardly pivotable about its respective living hinge to an open position under the force of foam precursor injection. The tabs extend into the foam space in diverging relation to one another in the respective open positions. Each hinge is sufficiently resilient to return the pivotable portion of each tab to a position at least approximating its respective closed position.

THE DRAWINGS

These and other advantages of the present invention will be readily appreciated as the same becomes better understood by reference to the following detailed description when considered in connection with the accompanying drawings wherein:

FIG. 1 is a diagrammatic, fragmentary, perspective view an instrument panel of a vehicle having an airbag door prepared according to the present invention;

FIG. 2 is an enlarged, fragmentary longitudinal cross-sectional view taken generally along lines 2—2 of FIG. 1;

FIG. 3 is diagrammatic sectional view of foam mold tool in which the outer skin and backing panel are shown positioned within a cavity of the tool and foam precursors injected into the foam space therebetween;

FIG. 4 is an enlarged, diagrammatic, sectional view of the foam entry hole region of the article provided within the mold tool;

FIG. 5 is a bottom plan view of the backing panel looking from within the foam space toward the foam entry hole;

FIG. 6 is a diagrammatic perspective view of an alternative entry hole backing device for use in connection with a conventional foam entry hole;

FIG. 7 is an enlarged, fragmentary, diagrammatic, sectional view of the foam mold tool in which the panel and entry hole backing device of FIG. 6 are supported over the skin in preparation for the injection of foam precursors; and FIG. 8 is a bottom plan view of an alternative backing panel.

DETAILED DESCRIPTION

FIG. 1 illustrates an instrument panel 10 of an automotive vehicle 12 having a PSIR airbag system (not shown) mounted to support structure behind the instrument panel 10 in conventional manner. An airbag of the system is deployable through an opening 16 in the panel 10 for escapement into the interior passenger compartment of the vehicle 12. The opening 16 is normally closed by a door assembly 18 manufactured and constructed according to this invention. The door assembly 18 is mounted within the opening 16 to conceal the PSIR system and is hinged adjacent its forward-most edge 20 to enable the door assembly 18 to swing upwardly upon deployment of the airbag to permit its escapement through the opening 16.

As illustrated in FIG. 2, the door assembly 18 includes an aesthetically pleasing flexible shell or skin 22 which is formed by liquid or dry slush molding or casting methods of the type set forth in U.S. Pat. Nos. 4,217,325; 4,562,025; and 4,664,864, all commonly assigned to the assignee of the present invention and incorporated herein by reference. In these methods, a thin layer of vinyl or other plastics is formed with a class A outer surface 28 cast against a surface of the mold tool. The door assembly 18 includes a foam, typically made or urethane, a urethane derivative, or other suitable chemistry, backing layer 24 bonded to a rigid metal or plastics backing panel 26.

The backing panel 26 has a backside outer surface 30, an opposite front side inner surface 32, and a peripheral edge 34. The panel 26 is formed to conform in size and shape to the deployment opening 16 and to the curvatures of the instrument panel 10. Suitable metal materials for the panel 26 include any of the steel and aluminum alloys presently used in PSIR backing panel applications, whereas suitable plastics materials for the panel 26 include thermoplastic olefin (TPO), thermoplastic elastomers (TPE), polyesters, polyurethanes, ABS, PC/ABS, PPO and SMA.

As illustrated in FIG. 3, the skin 22 and backing panel 26 are positioned within a mold cavity 36 of a foam injection mold tool 38. The outer class A surface 28 of the skin 22 is supported by a contoured mold surface 40 of a lower mold part 42 of the tool 38, while the backing panel 26 is releasably secured to a movable upper mold part 44 of the tool 38, supporting the backing panel 26 as an insert within the cavity 36 in spaced relation to the skin 22 to define an open space 46 for the foam 24 between the skin 22 and the inner surface 32 of the backing panel 26. A peripheral return or flange 48 of the skin 22 extends around the edge 34 and over outer backside surface 30 of the panel 26 to enclose the foam space 46, while leaving a small amount of clearance between the flange 48 and panel 26 to serve as an outlet for the escape of excess foam from the foam space 46 during molding of the foam. Some excess foam is left between the flange 48 and the panel 36 and serves to bond the flange 48 to the panel 36 when the foam cures. The foam that escapes is deposited on the exposed backside surface 30 of the panel 26 and may be removed following molding.

The upper mold part 44 includes a foam injection passage 50 that extends into the cavity 36. The backing panel 26 is formed with a foam entry hole 52 aligned with the injection passage 50 of the mold tool for directing a foam precursor mixture delivered from a foam injection nozzle 54 into the foam space 46 to generate the foam layer or core 24 therein. The entry hole 52 is centrally located with respect to the foam space 46 according to conventional practice to distribute the foam precursor mixture evenly and at a generally uniform rate throughout the foam space 46, and hence the entry hole 52 is spaced from the peripheral edge 34 of the panel 26. As shown in the figures, the radius of the foam entry hole is substantially less than both the length and the width of the backing panel. Conventional mold tooling and foam mixing and delivery equipment may be employed in carrying out the manufacture of the door assembly 18 according to this invention. Known foam precursor formulations may be used to produce the foam core 24, as set forth in U.S. Pat. No. 4,784,366, commonly owned by the assignee of this invention and its disclosure incorporated herein by reference.

When the foam precursors enter the foam space 46, they react and begin expanding and filling the space 46 with foam. The expansion of the foam is constrained across the thickness of the space 46 between the skin 22 and the inner surface 32 of the backing panel 26, and develops a generally uniform foam density. Gradual variations may exist in the thickness of foam space 48 such as across formed-in strengthening ribs 26a and other contour changes which are commonly provided to stiffen the panel 36 and thereby increase its resistance to bending upon deployment of the airbag. Such changes in thickness do affect the foam density in such regions but the transition is gradual and generally undetectable in the finished product and hence do not present a problem. However, in the region of the foam entry hole 52, if measures are not taken to control the expansion of the foam, it will expand freely out through the entry hole 52 and into the much larger volume of space of the injection passage 50, as is the case according to present practice in making such airbag door assemblies. Such produces an abrupt, marked decrease in the density of the foam 24 in the entry hole region and in the case of a deployment door where the overall thickness of the assembly 18 is about 8 mm or less such results in the formation of a visibly detectible sunken or depressed region on the outer class A surface 28 of the skin 22 which feels to the touch as a localized soft spot that is much easier to depress than the immediate surrounding foam region of the door assembly 18. This condition is unsatisfactory and the aim of the present invention is to correct it.

As a solution to this problem, the present invention provides supplemental foam support structure 56 that is carried by the panel 26 and extends therefrom into the foam space 46 and across the foam entry hole 52 to at least partially and preferably substantially cover or shield the open entry hole 52 from the underlying foam in the space 46. As the foam in this region expands, it is restrained within the foam space across its thickness between the skin 22 and an inner preferably rigid support surface 58 of the supplemental support 56, thereby preventing the foam from expanding freely out of the foam space 46 through the entry hole 52 into the foam injection passage 50. Consequently, the foam beneath the supplemental support 56 develops a relatively higher foam density than it otherwise would if allowed to expand freely into the foam injection passage 50 which corresponds more closely to that of the surrounding foam, thereby minimizing or all together eliminating the occurrence of sunken and soft spot regions on the class A surface 28 of the skin 22 in the final product.

According to a first presently preferred embodiment of the invention, the supplemental foam support 56 is formed as an integral, unitary portion of the backing panel 26, as illustrated in FIGS. 2–5. When constructing the backing panel 26 from sheet metal, it is preferred to form the supplemental support 56 by punching at least one and preferably an adjacent pair of generally arcuate and preferably semicircular cuts in the panel 26 to define a pair of adjacent tab or ear portions 56a, 56b that are joined to the panel 26 at their bases to an intermediate thin web portion 60. In other embodiments, the generally arcuate cuts may have any suitable shape to include a rectangular U-shape. The tabs 56a, 56b are bent out of the general plane of the panel 56 along fold lines 62a, 62b at the bases of the tabs so as to project from the inner surface 32 of the panel 56 into the foam space 46 and outwardly away from one another in opposite directions lengthwise of the panel 26 at predetermined angles with respect to the inner surface 32, as illustrated best in FIGS. 4 and 5. The outward displacement of the tabs 56a, 56b leaves behind a pair of adjacent cut-out openings 52a, 52b partitioned by the web portion 60 and bounded by the walls of the cuts and the fold lines 62a, 62b and together providing the foam entry hole 52 of the panel 26. An angle of about 45 degrees between each tab portion 56a, 56b and the inner surface 32 is preferred. This arrangement of the tabs 56a, 56b permits the foam precursor material to be delivered at an acceptable rate into the foam space 46 through the segmented foam entry hole 52 while locating the tabs 56a, 56b in substantially overlying covering relation to the pour hole openings 52a, 52b to thereby shield a substantial portion of the respective openings 52a, 52b as illustrated in FIG. 5.

Greater or lesser angles of the tab portions 56a, 56b could be employed depending upon the application and considering its effect on the ability to deliver the foam precursor mixture into the foam space past the tab portions and the ability of the tab portions to provide the backing support needed to control the density of the foam in the entry hole region. At one extreme the tab portions would form no angle to the panel 26 in which case the entry hole 52 would be closed by the tab portions precluding the delivery of foam into the space 46 or else the tabs would have to be completely separate from and spaced below the panel 26. At the opposite extreme, the tabs 56a, 56b would be arranged at 90 degree angle to the panel 26 and although such would permit easy entry of the foam into the space 46, it would provide little if any backing support to the foam. 45 degrees is thus a compromise providing an optimum balance between foam delivery and foam backing considerations.

In addition to serving as supplemental backing structure for the foam, the tab portions 56a, 56b serve also as a baffle during the delivery if the foam into the foam space 46. The downwardly and outwardly divergent relation of the tab portions 56a, 56b directs the foam precursor into the foam space at an angle and to opposite sides of the entry hole 52 lengthwise of the panel 26 to distribute the mixture more evenly throughout the foam space 46.

As mentioned above, the backing panel 56 may be injection molded from rigid plastics material and in such case the same segmented entry hole/tab arrangement may be utilized with the tabs 56a, 56b molded as a unitary portion of the backing panel 56 and arranged in the same angular relation with respect to the entry hole openings 52a, 52b as that for the metal panel. This panel would function in the same way as that described for the metal panel and achieve the same results.

It should be noted that when, for example, the backing panel 56 is made of plastic as opposed to metal, the fold lines 62a, 62b may function as flexible hinges, especially if molded with a thinner cross section than the normal mold thickness of the backing panel 56. In such a case, before injection of the foam precursor material, the tab portions would form either a relatively small angle or no angle to the panel 26 in which case the entry hole 52 would be virtually closed by the tab portions 56a, 56b. During injection of the foam precursor material, the injection force of the material would exert pressure on the tab portions forcing the tab portions to hinge around fold lines 62a, 62b, thus increasing the angle of the tab portions 56a, 56b with respect to the panel 56 and allowing the foam precursor material to enter into space 46. After injection of the foam precursor material, the tab portions 56a, 56b would return to their original portion or very close thereto by virtue of plastic memory impacted on the hinge and/or the force imparted to rigid support surface 58 by the expanding foam precursor material. In such a situation, the density of the foam precursor material in the region of the foam entry hole would be virtually the same on the remainder of the assembly 18.

In manufacturing a trim component of this type, the panel is first molded from a rigid plastics material. The foam entry hole is then formed by cutting or stamping a pair of semi-circular slots in the panel. The slots define a pair of semicircular openings that together form the foam entry hole. The slots also define unitary tabs that integrally extend across and close the respective openings in respective closed positions. A living hinge having a cross section thinner than that of the immediately adjacent portions of the panel is formed across each tab. The tabs are outwardly pivotable about their respective living hinges to respective open positions under the force of foam precursor injection. In their open positions the tabs extend away from the panel in outwardly diverging relation to one another. The hinges are formed to be sufficiently resilient to return the pivotable portions of the tabs to respective positions that at least approximate the closed position.

According to another embodiment of the invention illustrated in FIGS. 6 and 7, the supplemental foam support 56' is formed as a separate component from the backing panel 26'. The foam entry hole 52' of the panel 56' has the same general segmented arrangement as that of the first embodiment, but in this embodiment the tab portions described above have been completely cut out and disconnected from the backing panel 26' leaving only the two adjacent entry openings 52a' and 52b' separated by the thin web portion 60 of the panel 26'.

The supplemental foam support 56' comprises a spring clip component having a central mounting portion 64 with a generally U-shaped wall defining an open channel 66 and terminating in a pair of ear or tab projections 68, 70 extending downwardly and diverging outwardly of the channel 66 at a predetermined angle. The clip 56' is fabricated preferably from rigid molded plastics material such as thermoplastic olefin (TPO), or thermoplastic elastomer (TPE), but may be formed of stamped sheet metal to provide a similar rigid structure.

The support 56' is mounted to the panel 26' by extending the tabs 68, 70 through the openings 52a', 52b' to guide an receive the web portion 60' of the panel 26' into the channel 66, such that the tabs 68, 70 extend downwardly and outwardly into the foam space 46 in the same manner and relationship as described above for the unitary tab portions 56a, 56b. The support clip 56' may be held in place by adhesives or mechanical fasteners, but preferably is self-attaching. As seen in the FIGS. 6 and 7, the channel 66 is formed with a pair of locking projections 72, 74 projecting laterally into the channel 66 from opposite side walls thereof in position to extend beneath the web portion 60' of the backing panel 26' when received in the channel 66, thereby locking the support clip 56' firmly in place on the panel 26'. The support clip 56', although rigid, is sufficiently resilient to enable the opposing side walls of the channel 66 to spread apart enough to allow the web 60' to pass by the locking projections 72, 74 and thereafter return to shape bringing the projections 72, 74 into locking position beneath the web 60. Once locked in position, the tabs 68, 70 function as a rigid backing support for the underlying foam in the same manner described above for the tab portions 56a, 56b.

According to another embodiment of the invention illustrated in FIG. 8, the tabs 56a", 56b" may include apertures 80. In such a case, in addition to the tabs 56a", 56b" providing foam support, the apertures provide for better mixing of any precursor that may flow therethrough during injection, and venting of gases while the precursor reacts and cures. The apertures 80 may have various shapes, sizes and quantities to permit the precursor to have a relatively low viscosity during injection to flow through the apertures 80, but inhibit or substantially reduce flow back through the apertures 80 by virtue of the increasing viscosity of the foam as it reacts and cures.

Although the invention has been described in the above embodiments in relation to the manufacture of an airbag door for an automobile, those skilled in the art will appreciate that the invention is applicable to other interior trim applications where a soft panel assembly having a thin foam section is produced by a process in which foam precursors are poured through a foam entry hole of a rigid backing panel of the assembly to generate a thin foam layer between the panel and an overlying flexible skin layer. Other examples include, but are not limited to, doors for console and glove storage compartments, arm rests, door panels, instrument panels, and the like. Accordingly, the disclosed embodiments are representative of presently preferred forms of the invention, and are intended to be illustrative rather than definitive thereof. The invention is defined in the appended claims.

What is claimed is:

1. An automotive interior trim panel assembly, comprising:
   a rigid backing panel having a foam entry hole opening formed therein;
   an outer skin of flexible plastics material overlying said panel enclosing a foam space between said panel and said skin;
   a foam layer formed in place within said foam space by pouring foam precursors into said space through said foam entry hole where they react and expand within said space between said skin and said panel and cure to a controlled foam density to generate said foam layer within said space bonded to said skin and said panel; and
   a supplemental foam backing structure supported by said panel at least partially across said entry hole to provide a rigid backing to the foam that develops in the region of said entry hole to control the density of such foam.

2. The assembly of claim 1, wherein said entry hole comprises at least one opening in said panel and said supplemental foam backing structure includes at least one tab member extending from an edge of said opening into said foam space at a predetermined angle across said opening to at least partially shield said opening.

3. The assembly of claim 2, wherein said tab members extend at about a 45 degree angle with respect to said panel.

4. The assembly of claim 2, wherein said tab members are a unitary portion of said panel.

5. The assembly of claim 4, wherein said tab members are of the same general size and shape as their respective said openings.

6. An automotive interior trim panel assembly, comprising:
   a rigid backing panel having a foam entry hole opening formed therein;
   an outer skin of flexible plastics material overlying said panel enclosing a foam space between said panel and said skin;
   a foam layer formed in place within said foam space by pouring foam precursors into said space through said foam entry hole where they react and expand within said space between said skin and said panel and cure to a controlled foam density to generate said foam layer within said space bonded to said skin and said panel;
   a supplemental foam backing structure supported by said panel at least partially across said entry hole to provide a rigid backing to the foam that develops in the region of said entry hole to control the density of such foam, said entry hole comprising at least one opening in said panel and said supplemental foam backing structure including at least one tab member extending from an edge of said opening into said foam space at a predetermined angle across said opening, the tab member including at least one aperture passing through a thickness of the tab member.

7. An automotive interior trim panel assembly, comprising:
   a rigid backing panel having a foam entry hole opening formed therein;

an outer skin of flexible plastics material overlying said panel enclosing a foam space between said panel and said skin;

a foam layer formed in place within said foam space by pouring foam precursors into said space through said foam entry hole where they react and expand within said space between said skin and said panel and cure to a controlled foam density to generate said foam layer within said space bonded to said skin and said panel;

a supplemental foam backing structure supported by said panel at least partially across said entry hole to provide a rigid backing to the foam that develops in the region of said entry hole to control the density of such foam, said entry hole comprising at least one opening in said panel and said supplemental foam backing structure including at least one tab member extending from an edge of said opening into said foam space at a predetermined angle across said opening, said entry hole comprising an adjacent pair of said openings separated by a partitioning web of said panel and said supplemental foam backing structure comprising a pair of said tab members extending from said partitioning web into said foam space in diverging relation to one another at predetermined angles across their respective said openings to at least partially shield said openings.

8. An automotive interior trim panel assembly, comprising:

a rigid backing panel having a foam entry hole opening formed therein;

an outer skin of flexible plastics material overlying said panel enclosing a foam space between said panel and said skin;

a foam layer formed in place within said foam space by pouring foam precursors into said space through said foam entry hole where they react and expand within said space between said skin and said panel and cure to a controlled foam density to generate said foam layer within said space bonded to said skin and said panel;

a supplemental foam backing structure supported by said panel at least partially across said entry hole to provide a rigid backing to the foam that develops in the region of said entry hole to control the density of such foam;

said entry hole comprising an adjacent pair of said openings separated by a partitioning web of said panel;

said supplemental foam backing structure comprising a pair of said tab members extending from said partitioning web into said foam space in diverging relation to one another at predetermined angles across their respective said openings;

said supplemental foam backing structure being formed separately from said panel and including a central mounting portion having a generally U-shaped channel with opposing side walls terminating in outwardly diverging ears defining said tab members, said partitioning web being received in said channel and secured in place to mount said supplemental foam backing structure on said panel.

9. The assembly of claim 8, wherein said channel includes a pair of locking projections extending into said channel from said side walls thereof beneath said partitioning web to lock said web within said channel.

10. An automotive interior trim panel assembly, comprising:

a rigid backing panel having a foam entry hole opening formed therein;

an outer skin of flexible plastics material overlying said panel enclosing a foam space between said panel and said skin;

a foam layer formed in place within said foam space by pouring foam precursors into said space through said foam entry hole where they react and expand within said space between said skin and said panel and cure to a controlled foam density to generate said foam layer within said space bonded to said skin and said panel;

a supplemental foam backing structure supported by said panel at least partially across said entry hole to provide a rigid backing to the foam that develops in the region of said entry hole to control the density of such foam, said entry hole comprising at least one opening in the panel; and said supplemental foam backing structure comprising a plastics material and including at least one tab member extending from an edge of said opening across said opening and generally closing said opening in a closed position, said tab including a living hinge extending across a width of said tab, at least a portion of said tab being outwardly pivotable about said living hinge to an open position under the force of foam precursor injection, said hinge being sufficiently resilient to return said pivotable portion of said tab to a position at least approximating the closed position.

11. The assembly of claim 10 wherein:

said entry hole comprises an adjacent pair of said openings separated by a partitioning web of said panel;

said supplemental foam backing structure comprises a pair of said tab members extending from said partitioning web across said respective openings and closing said respective openings in respective closed positions;

each said tab including a living hinge extending across a width of each said tab, at least a portion of each said tab being outwardly pivotable about its respective living hinge to an open position under the force of foam precursor injection, said tabs extending into the foam space in diverging relation to one another in the respective open positions, each hinge being sufficiently resilient to return said pivotable portion of each said tab to a position at least approximating its respective closed position.

12. The assembly of claim 11, wherein said tabs are a unitary portion of said panel.

13. The assembly of claim 12, wherein said tabs are of the same general size and shape as their respective said openings.

14. An automotive interior trim panel assembly, comprising:

a panel having a foam entry hole opening formed therein;

a skin disposed opposite said panel and enclosing a foam space between said panel and said skin;

a foam layer formed in place within said foam space by pouring foam precursors into said space through said foam entry hole where they react and expand within said space between said skin and said panel and cure to a controlled foam density to generate said foam layer within said space bonded to said skin and said panel; and a supplemental foam backing structure supported by said panel at least partially across said entry hole;

the panel comprising rigid material to provide a backing for the trim panel assembly and the skin comprising a generally continuous sheet of flexible plastics material to provide a softer, aesthetically pleasing visible outer surface of the trim panel assembly.

16. The assembly of claim 14, wherein said entry hole comprises at least one opening in said panel and said supplemental foam backing structure includes at least one tab member extending from an edge of said opening into said foam space at a predetermined angle across said opening to at least partially shield said opening.

16. An automotive interior trim panel assembly, comprising:

- a backing panel having a length, width and thickness and a foam entry hole opening formed through the thickness of the panel;
- a skin of flexible plastics material disposed opposite said panel and enclosing a foam space between said panel and said skin;
- a foam layer formed in place within said foam space by pouring foam precursors into said space through said foam entry hole where they react and expand within said space between said skin and said panel and cure to a controlled foam density to generate said foam layer within said space bonded to said skin and said panel; and
- a supplemental foam backing structure supported by said panel at least partially across said entry hole;
- the foam entry hole opening size being substantially less than both the length and the width of the backing panel to preclude substantial weakening of the backing panel.

17. The assembly of claim 16, wherein said entry hole comprises at least one opening in said panel and said supplemental foam backing structure includes at least one tab member extending from an edge of said opening into said foam space at a predetermined angle across said opening to at least partially shield said opening.

* * * * *